(12) United States Patent
Green

(10) Patent No.: US 7,376,510 B1
(45) Date of Patent: May 20, 2008

(54) MAP DISPLAY FOR A NAVIGATION SYSTEM

(75) Inventor: Judson Green, Orlando, FL (US)

(73) Assignee: Navteq North America, LLC, Chicago, IL (US)

(*) Notice: Subject to any disclaimer, the term of this patent is extended or adjusted under 35 U.S.C. 154(b) by 340 days.

(21) Appl. No.: 10/981,907

(22) Filed: Nov. 5, 2004

(51) Int. Cl.
*G01C 21/32* (2006.01)

(52) U.S. Cl. .......................... 701/209; 701/28; 701/36; 701/56; 701/200; 701/208; 701/302; 340/915; 340/990; 340/995.1; 340/995.11; 340/995.12; 340/995.13; 340/995.14; 340/995.16; 340/995.17; 340/995.18; 340/995.19; 340/995.2; 340/995.21; 340/995.22; 340/995.23; 340/995.24; 340/995.25; 340/995.26; 340/995.27; 340/995.28

(58) Field of Classification Search .................. 701/28, 701/36, 56, 200, 208, 302, 209; 340/915, 340/990, 995.1, 995.11–995.28
See application file for complete search history.

(56) References Cited

U.S. PATENT DOCUMENTS

| | | | | |
|---|---|---|---|---|
| 4,504,913 | A | | 3/1985 | Miura et al. .................. 364/449 |
| 4,937,570 | A | * | 6/1990 | Matsukawa et al. ......... 340/905 |
| 4,977,509 | A | * | 12/1990 | Pitchford et al. ............ 701/207 |
| 5,161,886 | A | * | 11/1992 | De Jong et al. ............. 701/209 |
| 5,323,321 | A | * | 6/1994 | Smith, Jr. .................... 701/211 |
| 5,422,812 | A | * | 6/1995 | Knoll et al. ................. 701/209 |
| 5,504,482 | A | * | 4/1996 | Schreder ................ 340/995.13 |
| 5,731,978 | A | * | 3/1998 | Tamai et al. ................. 701/201 |
| 5,732,385 | A | * | 3/1998 | Nakayama et al. .......... 701/201 |
| 5,748,109 | A | * | 5/1998 | Kosaka et al. .......... 340/995.14 |
| 5,758,313 | A | * | 5/1998 | Shah et al. ............... 455/456.2 |
| 5,793,310 | A | * | 8/1998 | Watanabe et al. ....... 340/995.14 |
| 5,798,733 | A | * | 8/1998 | Ethridge ................. 342/357.08 |
| 5,874,905 | A | * | 2/1999 | Nanba et al. ............. 340/995.2 |
| 5,884,217 | A | * | 3/1999 | Koyanagi .................... 701/208 |
| 5,897,604 | A | * | 4/1999 | Takahashi et al. .......... 701/208 |
| 5,913,918 | A | * | 6/1999 | Nakano et al. ............. 701/208 |
| 5,919,245 | A | * | 7/1999 | Nomura ...................... 701/207 |
| 5,936,553 | A | * | 8/1999 | Kabel ..................... 340/995.14 |
| 5,945,927 | A | * | 8/1999 | Nakayama et al. ..... 340/995.14 |
| 6,006,161 | A | | 12/1999 | Katou ......................... 701/212 |
| 6,011,494 | A | * | 1/2000 | Watanabe et al. ....... 340/995.14 |
| 6,067,502 | A | * | 5/2000 | Hayashida et al. ......... 701/209 |
| 6,076,041 | A | * | 6/2000 | Watanabe .................... 701/211 |
| 6,188,956 | B1 | * | 2/2001 | Walters ....................... 701/200 |
| 6,202,026 | B1 | * | 3/2001 | Nimura et al. .............. 701/211 |
| 6,259,989 | B1 | * | 7/2001 | Kusama ...................... 701/208 |
| 6,289,278 | B1 | * | 9/2001 | Endo et al. .................. 701/208 |
| 6,314,370 | B1 | * | 11/2001 | Curtright .................... 701/213 |

(Continued)

FOREIGN PATENT DOCUMENTS

WO WO2006/015892 A1 2/2006

*Primary Examiner*—Thomas G. Black
*Assistant Examiner*—Wae Lenny Louie
(74) *Attorney, Agent, or Firm*—Lisa M. Schoedel; Frank J. Kozak; Jon D. Shutter

(57) ABSTRACT

A system and method are disclosed for displaying map information on a portable computing device. When approaching a location at which maneuvering guidance is to be provided by the portable computing device, the portable computing device presents alternating images on a display screen. The alternating images include an overhead view map image and either a perspective view map image or a stylized image. The stylized image can be either a 2D image or a 3D image.

18 Claims, 8 Drawing Sheets

U.S. PATENT DOCUMENTS

| | | |
|---|---|---|
| 6,388,664 B2 * | 5/2002 | Sone .......................... 345/428 |
| 6,430,501 B1 * | 8/2002 | Slominski ................... 701/209 |
| 6,487,305 B2 * | 11/2002 | Kambe et al. .............. 382/113 |
| 6,603,407 B2 * | 8/2003 | Endo et al. ............ 340/995.14 |
| 6,611,753 B1 * | 8/2003 | Millington .................. 701/209 |
| 6,621,494 B2 * | 9/2003 | Matsuoka et al. .......... 345/427 |
| 6,741,929 B1 | 5/2004 | Oh et al. .................... 701/209 |
| 6,756,919 B2 * | 6/2004 | Endo et al. ............ 340/995.14 |
| 6,823,259 B2 * | 11/2004 | Miyazawa ................... 701/209 |
| 6,868,336 B1 * | 3/2005 | Nakano ....................... 701/208 |
| 7,039,521 B2 * | 5/2006 | Hortner et al. .............. 701/211 |
| 7,076,364 B2 * | 7/2006 | Kuroda et al. .............. 701/211 |
| 7,079,948 B2 * | 7/2006 | Morita et al. ................ 701/211 |
| 7,177,761 B2 * | 2/2007 | Kaufman et al. ........... 701/211 |
| 2004/0098175 A1 | 5/2004 | Said et al. ..................... 701/1 |

* cited by examiner

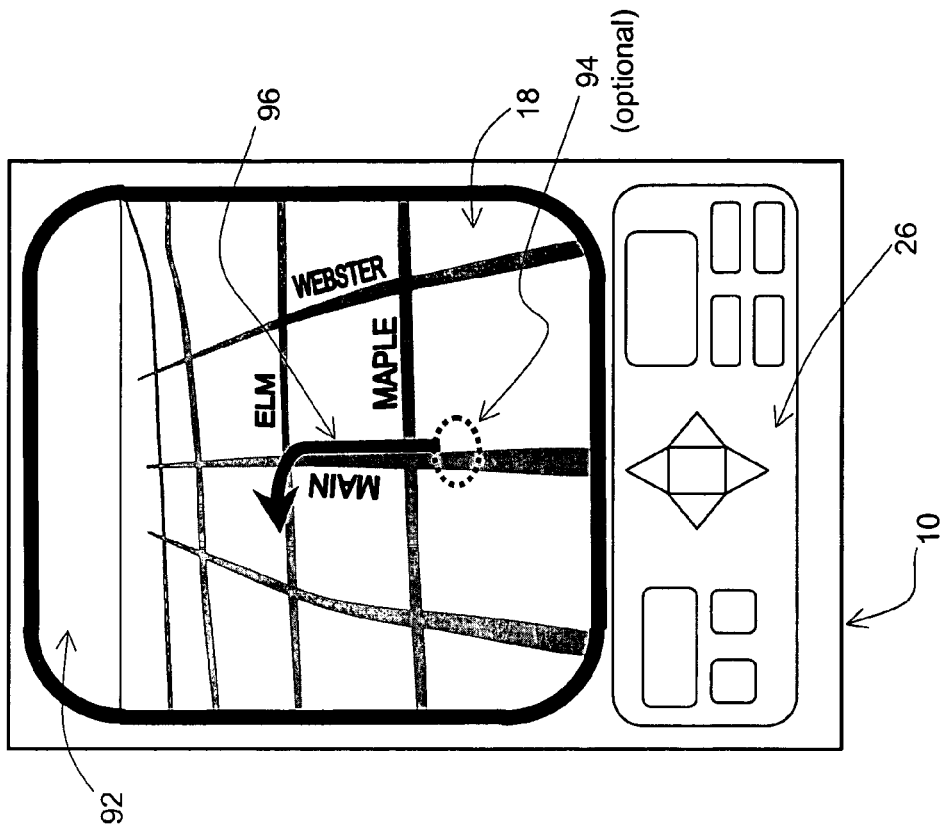
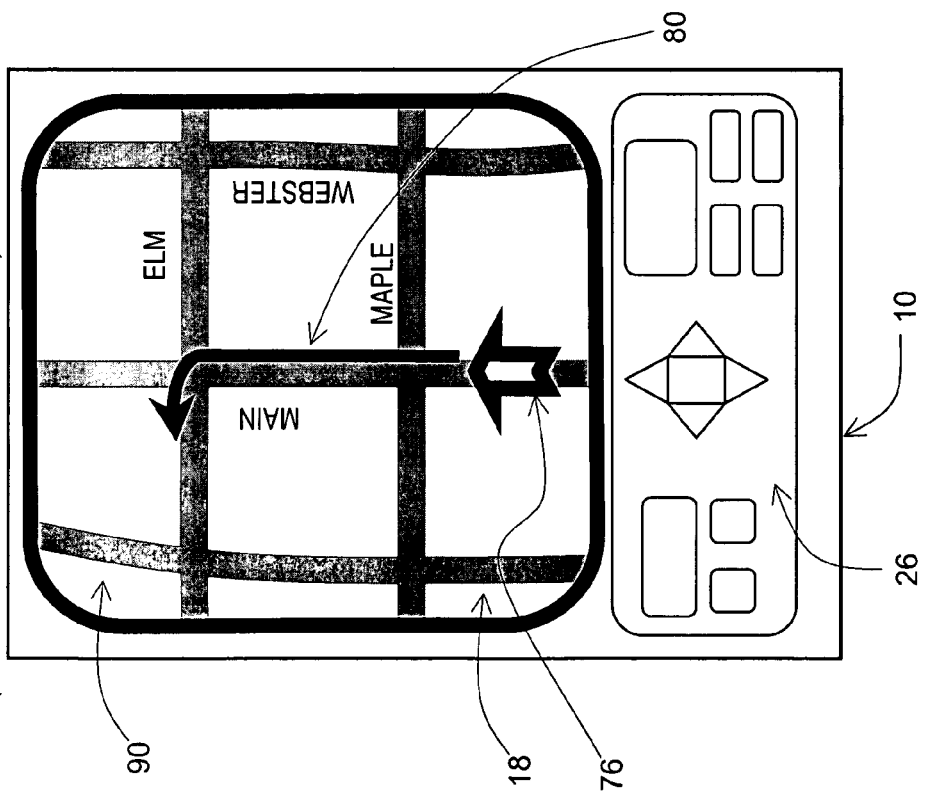

PERSPECTIVE VIEW
(several seconds, and so on)

OVERHEAD VIEW
(several seconds, then to FIG. 5D)

PERSPECTIVE STYLIZED VIEW

2D STYLIZED VIEW

MAP DISPLAY FOR A NAVIGATION SYSTEM

BACKGROUND OF THE INVENTION

The present invention relates to displaying map information on a portable computing device.

Various kinds of systems and applications are available that provide persons with useful information while traveling. For example, navigation systems installed in vehicles provide useful information to vehicle drivers and passengers, including information for finding desired destinations, as well as guidance for following routes to desired destinations. Similar features are available on portable (e.g., handheld) devices. These types of portable devices include personal navigation systems (PNSs), which are portable devices designed specifically to provide navigation and/or map-related features, such as destination searches, routing and/or map display. These types of portable devices also include general purpose devices, such as personal digital assistants (PDAs), on which are installed navigation and/or map-related applications. These types of portable devices can be used in vehicles, but can also be carried by pedestrians or by persons using other modes of transportation, such as trains, boats, and so on.

A continuing consideration associated with providing navigation and/or map information on portable devices is making the information easy to understand, given the relatively small size of the display. Portable devices, such as personal navigation systems and personal digital assistants, have relatively small display screens compared to desktop computers, notebook computers or even in-vehicle navigation systems. Therefore, efficient utilization of available display screen resources can be a factor when providing navigation and/or map related features on a portable device.

Accordingly, there is a need to provide navigation or map-related features on portable systems in a manner that is easy to understand.

Further, there is a need to provide navigation- or map-related features on portable systems that effectively uses available display resources.

SUMMARY OF THE INVENTION

To address these and other objectives, the present invention includes a system and method for displaying map information on a portable computing device. When approaching a location at which maneuvering guidance is to be provided by the portable computing device, the portable computing device presents alternating images on a display screen. The alternating images include an overhead view map image and either a perspective view map image or a stylized image. The stylized image can be either a 2D image or a 3D image.

BRIEF DESCRIPTION OF THE DRAWINGS

FIGS. 5A, 5B, 5C, and 5D show a sequence of map view images on the display screen of the portable navigation system of FIG. 1.

DETAILED DESCRIPTION OF THE PRESENTLY PREFERRED EMBODIMENTS

Figure 1:
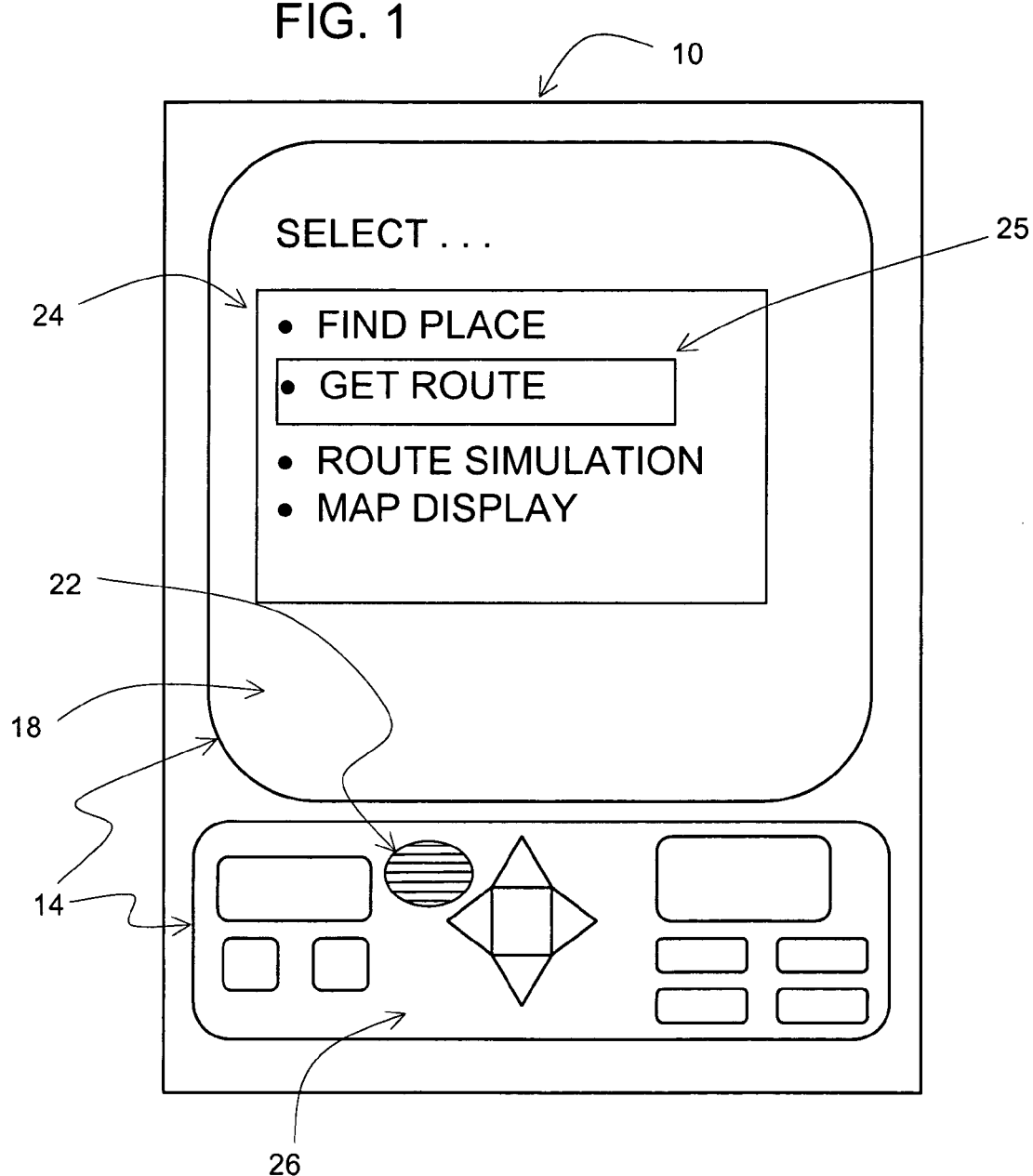
FIG. 1 illustrates a front side of a portable navigation system that includes a first embodiment of the disclosed system and method.

FIG. 1 shows a portable navigation system 10. The portable navigation system 10 is a combination of hardware and software components. The portable navigation system 10 includes a self-contained power source, such as a battery (not shown). The portable navigation system 10 has a size and weight so that it can easily be carried by a person. The portable navigation system 10 may be designed primarily for navigation purposes, or alternatively, the portable navigation system 10 may be a general purpose device, such as a personal digital assistant (PDA), on which navigation application software is installed.

Embodiments of the portable navigation system may be used with mounting hardware so that the portable navigation system may be temporarily or permanently mounted in or on a vehicle, such as an automobile. The mounting hardware may allow the portable navigation system to be removable so that it can be either mounted and used in a vehicle or removed and carried by a person.

The portable navigation system 10 includes a user interface 14. The user interface 14 includes a means for receiving input from a user and a means for conveying information to the user. In this embodiment, the user interface 14 of the portable navigation system 10 includes a display 18 and a speaker 22. The user interface 14 also includes an input panel 26 that includes a keypad, buttons, a toggle, or other means by which a user can manually provide input commands or other information. The user interface of the portable navigation system 10 may also include a microphone and appropriate speech recognition technology that enables a user to enter information verbally. The user interface 14 of the portable navigation system 10 may also include a touch screen and/or stylus. Other types of user interface technology may also be used.

The user interface 14 includes appropriate programming to allow a user to receive information from and provide information to the portable navigation system 10. The user interface programming may provide for presentation of menus, icons, etc., on the display screen 18 of the portable navigation system in order to allow the user to select programs and features, input commands, etc. FIG. 1 shows one example of a way that the user interface 14 allows a user to select a function. A menu 24 is presented on the display screen 18 of the portable navigation system 10. The menu 24 lists several different functions. The user interface programming renders a box 25 highlighting one of the menu entries. The user interface programming allows the user to move the highlighting box 25 from one entry on the list to another. Once the function desired by the user is highlighted with the box 25, the user can select the desired function by operating an appropriate key on the keypad.

Figure 2:
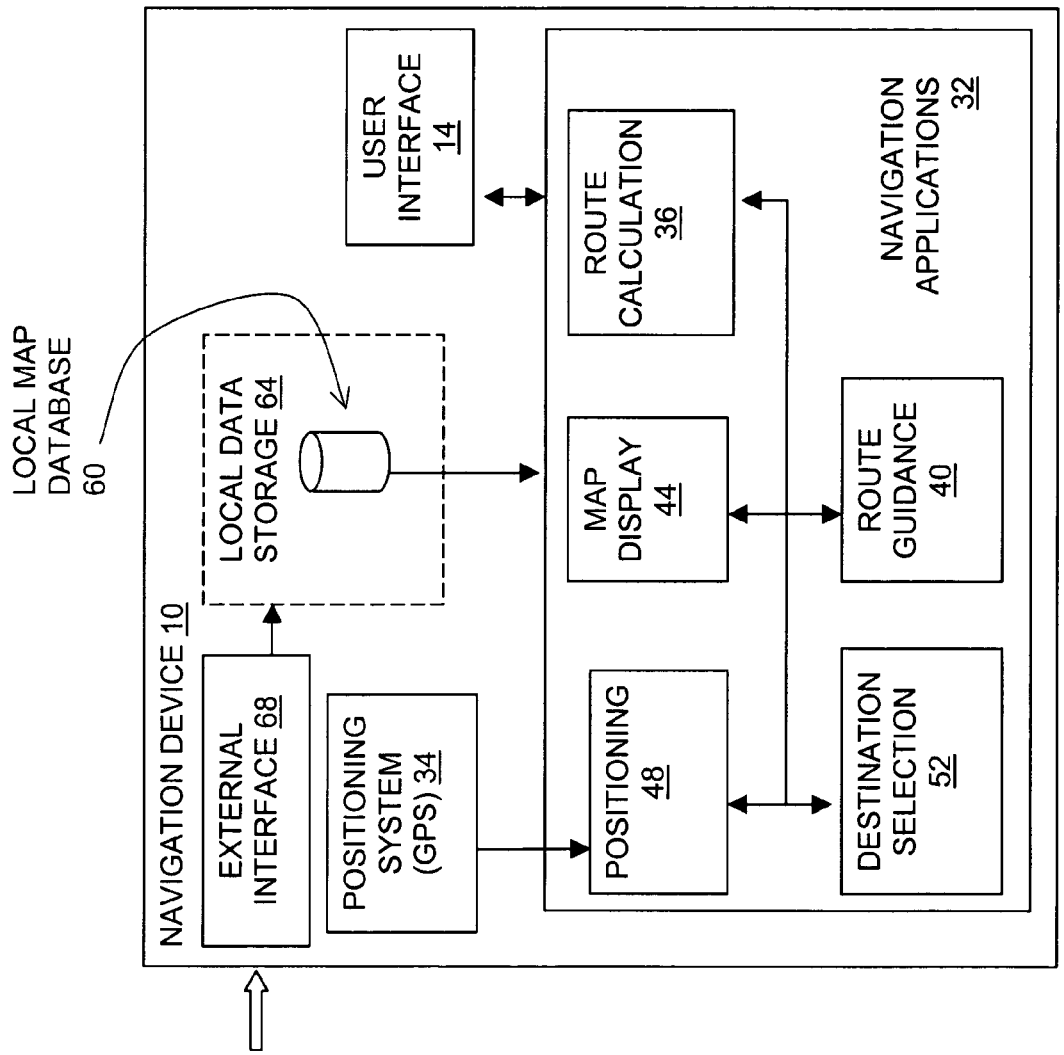
FIG. 2 is a block diagram showing components of the portable navigation system in FIG. 1.

FIG. 2 shows a block diagram of some of the components of the portable navigation system 10. The portable navigation system 10 includes a positioning system 34. The positioning system 34 determines a current position of the portable navigation system 10. The positioning system 34 may be implemented by any location sensing device or technology. For example, the positioning system may include a GPS unit, or systems that use time-of-arrival, direction-of-arrival, triangulation, WiFi, RFID, Loran, dead reckoning, or combinations of these or other systems.

In this embodiment, the portable navigation system 10 includes navigation applications 32. The navigation applications 32 are software programs that perform certain navigation-related or map-related functions. These navigation applications 32 are stored on an appropriate data storage medium in the portable navigation system 10. The navigation applications 32 are run, when needed. Included among the navigation applications 32 are a route calculation application 36, a route guidance application 40, a map display application 44, a positioning application 48 and a destination selection application 52. Other embodiments may have more or fewer of these applications. Alternatively, in some embodiments, two or more of these applications may be combined.

The portable navigation system 10 includes a local map database 60. The local map database 60 is stored on a data storage medium 64 in the portable navigation system 10. The map database 60 is used by the navigation applications 32 to provide navigation-related features. The map database 60 includes information about the roads, intersections, points of interest, and other geographic features in a covered geographic area. The covered geographic area may include one or more metropolitan areas, states, countries, regions, or combinations thereof.

In one embodiment, the local map database 60 is loaded into the portable navigation system 10 via an external interface 68. According to this embodiment, a program installed on a personal computer allows a user to select one or more smaller coverage areas from a relatively large coverage area to install on the portable navigation system 10. For example, a person may select the Los Angeles metropolitan area from the entire United States and install the map data for the Los Angeles metropolitan area on the portable navigation system 10.

The navigation applications 32 work together and use the map database 60 to provide various kinds of navigation functions. As an example, the navigation applications may be used for obtaining a route to a desired destination. According to this example, a user may use the destination selection application 52 to find a desired place. The starting point for the route is assumed to be the location of the user, which is determined by the positioning application 48 used in conjunction with the positioning system 34. Data indicating the location of the desired destination and the location of the starting point are forwarded to the route calculation application 36. The route calculation application 36 determines a route from the starting point to the destination and then forwards data indicating the route to the route guidance application 40. The route guidance application 40 generates appropriate directions for the user to follow the route.

When the portable navigation system is being used to guide the user along a route to a destination, it can be useful to show the user a graphical map of the area in which the user is located. The map display application 44 can be used for this purpose. The map display application 44 receives the data indicating the route from the route calculation application 36 and data indicating the user's current position from the positioning application 48. The map display application 44 accesses data from the local map database 60 for generating a graphical map image of the geographic area around the user's current position. The map display application 44 renders the image on the display screen 18 of the portable navigation device 10 showing the geographic area around the user's current position. The image may show the roads located in the vicinity of the user. An indicator mark may be superimposed on the image to indicate the user's current position. Also, the route that the user should follow may be indicated on the image, e.g., by highlighting, by an arrow, contrasting colors, etc.

Figure 3:
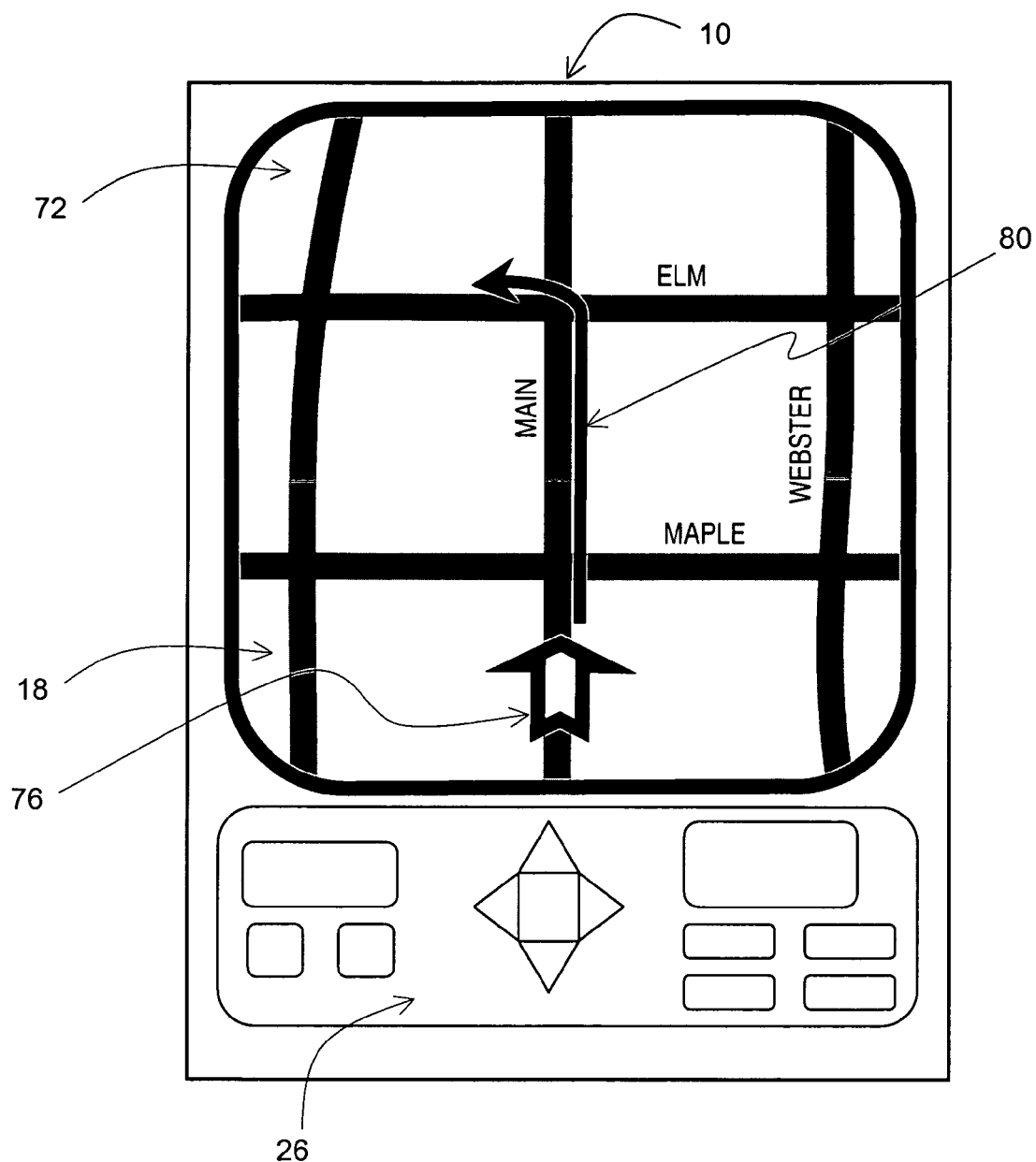
FIG. 3 illustrates the portable navigation system of FIG. 1 with the display showing a map image of the area around the current position of the portable navigation system.

Operation of the map display application 44 to produce a graphical map image of the road network around a user's location is illustrated in FIG. 3. FIG. 3 shows a map image 72 being displayed on the display screen 18 of the portable navigation system 10. The map image 72 shows the area around the position of the portable navigation system 10, including a portion of the road network. The map image in FIG. 3 shows the area in a 2D view, i.e., an overhead view looking straight down. The map image 72 includes an indicator 76 that corresponds to the position of the portable navigation system 10 relative to the roads being displayed in the map image 72. If the portable navigation system is being transported in a vehicle, the indicator 76 corresponds to the position of the vehicle. An indicator arrow 80 shows a maneuver that should be taken at an intersection ahead of the position of the portable navigation system 10 in order to follow a calculated route to a destination.

Figure 4:
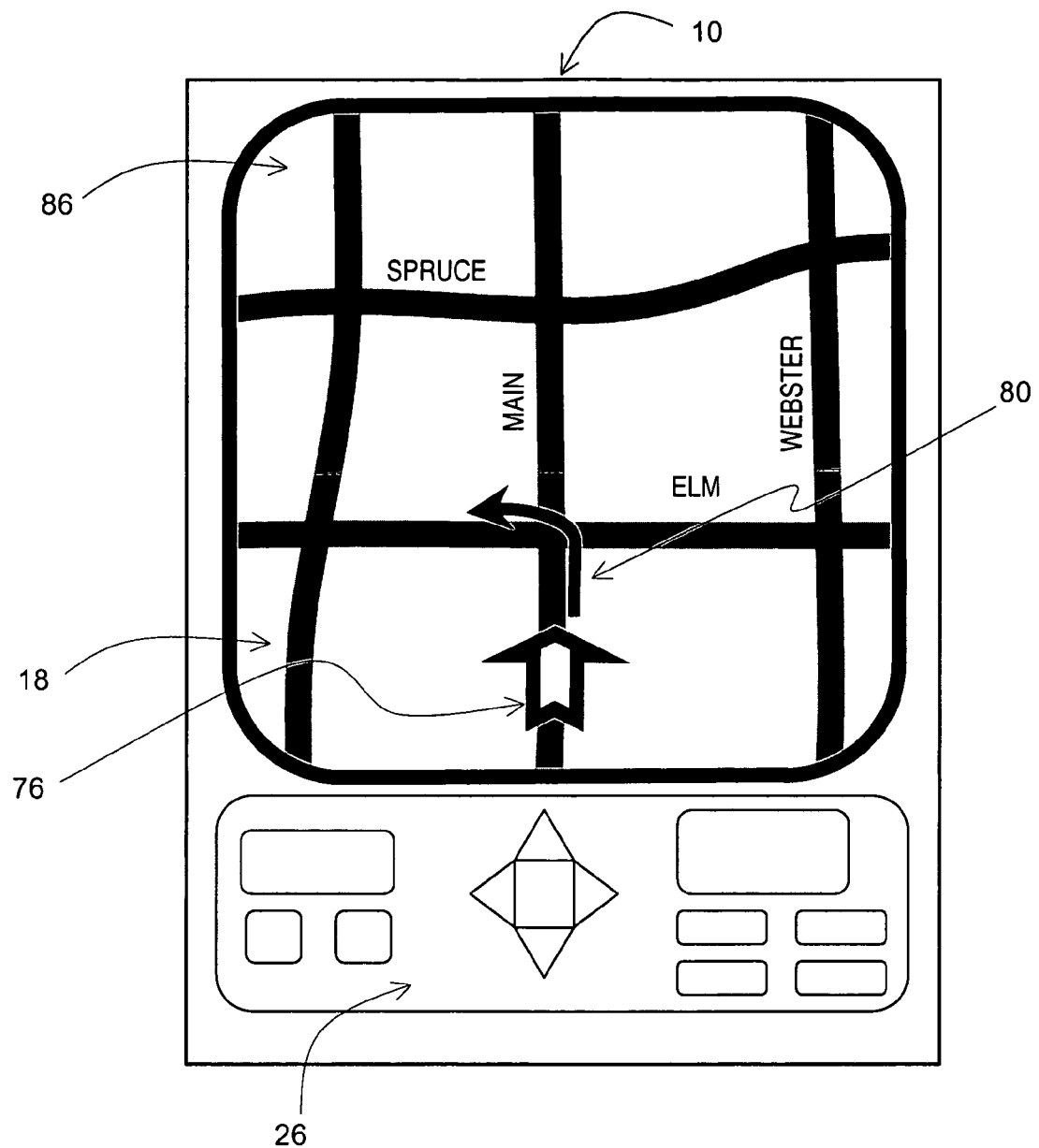
FIG. 4 illustrates the portable navigation system of FIG. 1 with the display showing a map image of the area surrounding the current position of the portable navigation system after it has been transported a distance along a route.

As the user travels along the route, the positioning system 34 in the portable navigation system 10 detects the change of position. Data indicating this change of position is forwarded to the map display application 44. The map display application 44 updates the graphical map image being displayed to indicate the new position of the portable navigation system 10. FIG. 4 shows the portable navigation system 10 with an updated graphical map 86 on the display 18. The updated graphical map 86 shows the position of the portable navigation system 10 after it has advanced toward the intersection at which a turn should be made. When updating the map image, the map display application 44 modifies the image to reflect a new current position of the portable navigation system 10 relative to the represented geographic features. The map display application 44 may modify the vantage point of the image, e.g., by advancing the vantage point. When advancing the vantage point, the map display application may cause some geographic features to no longer be shown in the image, whereas other geographic features are caused to come into view. Additional data is accessed from the map database 60, if necessary.

The portable navigation system uses an appropriate rate for rendering updated map images to reflect the changing current position of the portable navigation system. In some embodiments, the rendering of the sequence of updated images occurs fast enough (e.g., 24 frames per second) that the change of position in the images appears continuous. Alternatively, a slower rate of rendering a sequence of updated images may be used.

Some portable navigation systems provide additional kinds of features. For example, some portable navigation systems may provide map display views, similar to those shown in FIGS. 3 and 4, even when the user is not following a route to a desired destination. According to this feature, the map display application 44 may generate and display a map image that shows the road network in the vicinity of the user and possibly a marker indicating the user's position relative to the road network. Such a map image may be similar to those in FIGS. 3 and 4, except with the highlighted route omitted.

Another way to present map information on a display screen of a portable navigation system is to use a perspective or 3D view. In a perspective or 3D view, the vantage point of the map image is overhead, but the viewing angle is not straight down. Instead, the viewing angle is slanted toward the ground in a direction other than straight down. Because the viewing angle is slanted, roads and other geographic features in the map image are rendered so that they appear in perspective.

The data in the map database may be 2 dimensional (e.g., latitude, longitude) or 3 dimensional (e.g., latitude, longitude and altitude). The data in the map database may also include 3 dimensional features, such as buildings. When rendering a map image in perspective view, the map display application may transpose or otherwise process the data accessed from the map database so that it appears in perspective view.

A present embodiment provides an improvement in the way map information is presented to a user. In the present embodiment, when the portable navigation system is being conveyed along a route and is between locations at which maneuvering instructions are required, an overhead view map image is displayed on the display screen. However, when the portable navigation system approaches a location at which a maneuver instruction is required, the portable navigation system begins showing a sequence of alternating map view images on the display screen. According to the present embodiment, the alternating map view images include an overhead view and a perspective view. In this embodiment, when either map view image is being presented, it occupies substantially the entire area of the display screen of the portable navigation system. Each of the alternating map view images may be shown for a relatively short period of time, such as 1-5 seconds, although other times may be suitable. The amount of time each of the map view images is presented may be the same, or may differ. For example, as the portable navigation system is being conveyed toward an intersection at which a maneuver instruction is to be presented, the perspective view may be shown for 3 seconds, followed by the overhead view for 2 seconds, followed by the perspective view display again for 3 seconds, and so on.

As mentioned above, an indicator mark and maneuver arrow may be superimposed on a map view image to indicate a current position of the portable navigation system relative to the geographic features being shown in the map image and a required upcoming maneuver. In one version of the present embodiment in which alternating map views are presented on the display of the portable navigation system as it approaches a location at which a maneuvering instruction is needed, indicator marks are superimposed on both the overhead map image view and the perspective map image view to indicate current positions of the portable navigation system relative to the geographic features being shown in the respective map display views. Likewise, maneuver arrows showing the upcoming maneuver may be superimposed in both the overhead map view and the perspective map view when alternating map views are being presented on the display screen of the portable navigation system. As the portable navigation system is moved closer toward the location at which a maneuver instruction is needed, the map display application in the portable navigation system updates the position of the indicator mark in whichever map image view is being displayed to indicate the new current position.

In an alternative version of the present embodiment, when alternating map views are being presented on the display screen of the portable navigation system, a current position of the portable navigation system is not necessarily shown in both the overhead map view and the perspective map view. For example, in this alternative version, the current position of the portable navigation system is shown in the overhead view, but not in the perspective view. Instead, when the perspective map view is being displayed, a starting position mark may be used to show the starting position for the upcoming required maneuver. This starting position mark for the upcoming maneuver is not necessarily updated as the portable navigation system approaches the upcoming maneuver.

FIGS. 5A-5D illustrate operation of this embodiment.

Referring to FIG. 5A, when the portable navigation system 10 is being conveyed toward an intersection at which a maneuvering instruction is required, an overhead view (2D view) 90 is shown on the display screen 18 of the portable navigation system 10. The view shown in FIG. 5A is similar to the view shown in FIG. 3. Because the portable navigation system 10 is getting close to an intersection at which a maneuvering instruction is required, the map display application in the portable navigation system begins displaying alternating views. The alternating views continue with the display of a perspective view of the upcoming intersection at which a maneuvering instruction is required. FIG. 5B shows this perspective view 92 on the display screen 18 of the portable navigation system. Note that in FIG. 5B, an indicator mark 94 shows a position that does not necessarily correspond to the actual position of the portable navigation system, but instead may correspond to a starting point for the maneuver which is indicated by the arrow 96. The perspective view 92 shown in FIG. 5B may be shown on the display screen 18 of the portable navigation system for a short period of time (e.g., from less than 1 second to several seconds, such as 4-5 seconds or longer).

Figure 5D:
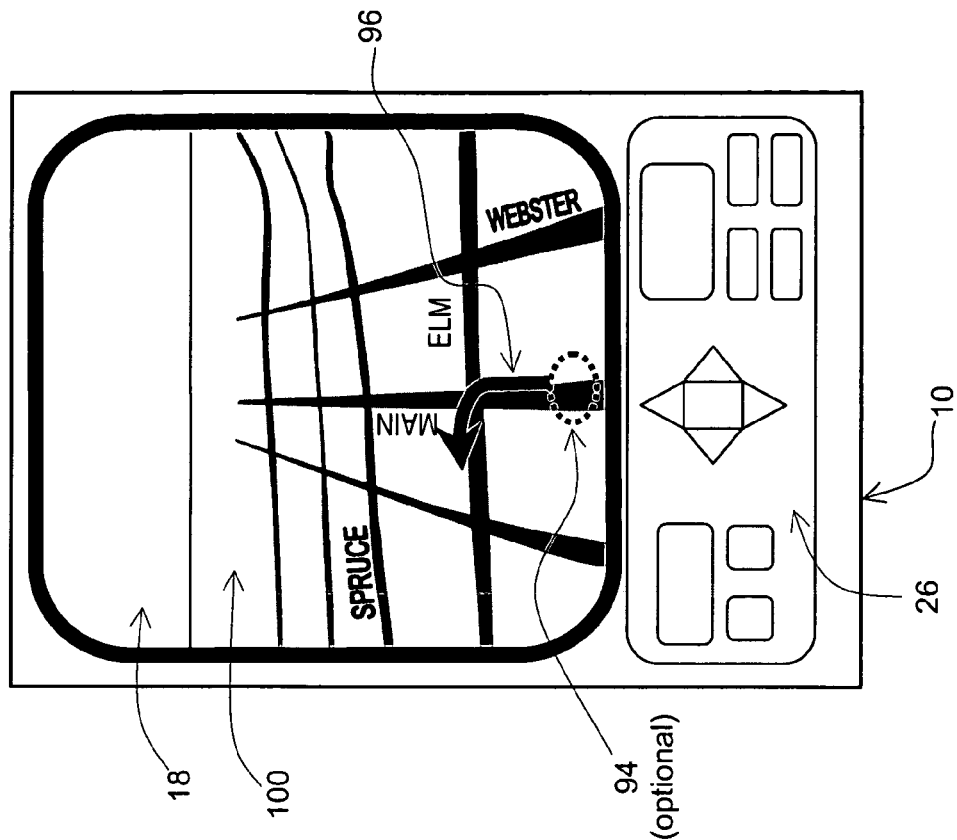
Figure 5C:
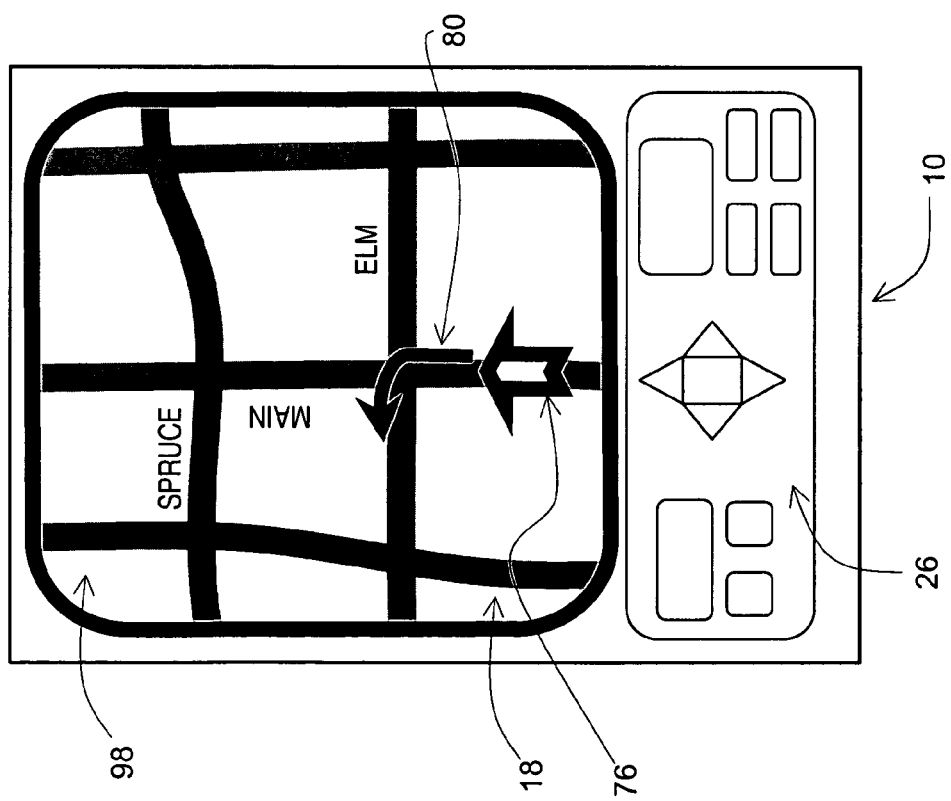

After the perspective display view 92 is shown on the display screen of the portable navigation system for the short period of time, the map display application continues to automatically alternate the map display by showing the overhead view again. FIG. 5C shows this new overhead view 98 on the display screen 18. Note that since the portable navigation system has moved closer to the intersection at which a maneuver instruction is needed, the map display application updates the location of the indicator mark 76 to correspond to the new current position. After the overhead view in FIG. 5C is shown for a short period of time, the map display application continues to automatically alternate the map display by showing the perspective view again. FIG. 5D shows this new perspective view 100 on the map display. The new perspective view 100 in FIG. 5D has been advanced to correspond to the previous overhead view.

The map display application continues to alternate showing the overhead view and the perspective view until the portable navigation system has passed through the intersection. After the portable navigation system has passed through the intersection, the map display application displays the overhead view. The map display application may display the overhead view continuously until the portable navigation system approaches the next location at which a maneuvering instruction is needed. Then, the map display application begins showing alternating map views again.

Figure 6:
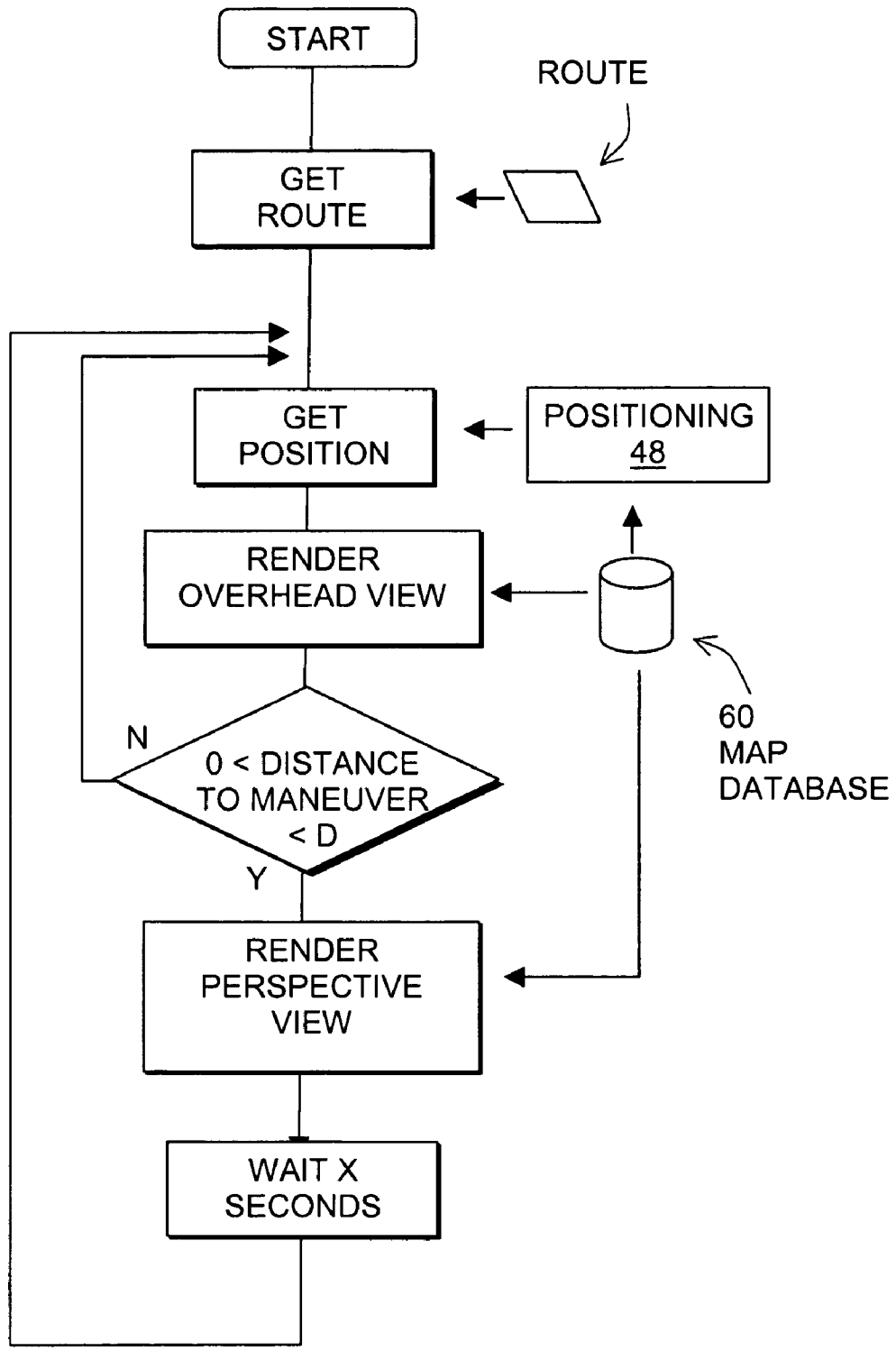
FIG. 6 is a flowchart of a process for providing alternating map view images on the display of the portable navigation system of FIG. 1.

FIG. 6 is a flowchart that shows the steps in the process for presenting alternating map views.

ALTERNATIVES

In the previous embodiment, it was explained how the map display application in a portable navigation system automatically begins showing alternating map views as a location is being approached at which a maneuvering instruction is to be presented. In alternative embodiments, the map display application can present alternating map views at other times. For example, in one alternative embodiment, the map display application can present alternating map views continuously. In another alternative embodiment, the map display application can present alternating map views when requested by the user.

Figure 7:
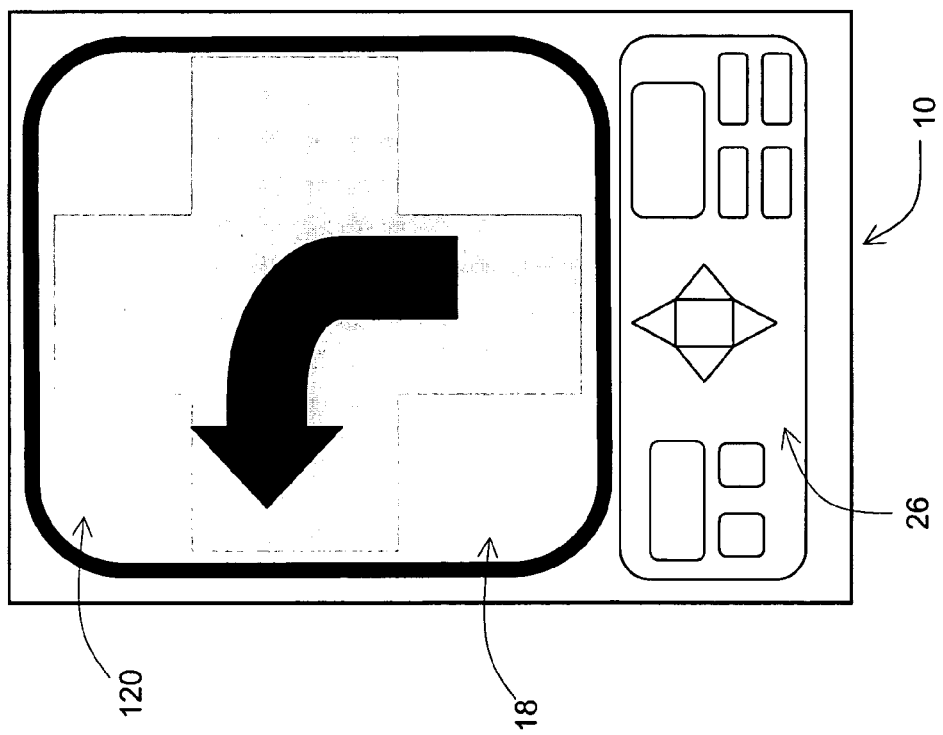
FIG. 7 illustrates the portable navigation system of FIG. 1 with the display showing a 2D stylized image according to an alternative embodiment.

In another alternative embodiment, the map display application may alternate map views (overhead or perspective) with stylized or iconic views. A stylized or iconic view is a diagram that shows the major features of an upcoming maneuver in a very easy-to-understand way with information about less important details omitted. FIG. 7 shows the display 18 of the navigation system with a 2D stylized view 120 of the maneuver required at an upcoming intersection. According to this alternative embodiment, when the portable navigation system is approaching an intersection at which a maneuvering instruction is to be presented, the map display application in the portable navigation system begins showing alternating displays including an overhead view (similar to FIG. 5A) and a stylized 2D view (similar to FIG. 7). As in the previous embodiments, the map display application continues to present these alternating views until the portable navigation system has passed through the location at which a maneuvering instruction is needed.

Figure 8:
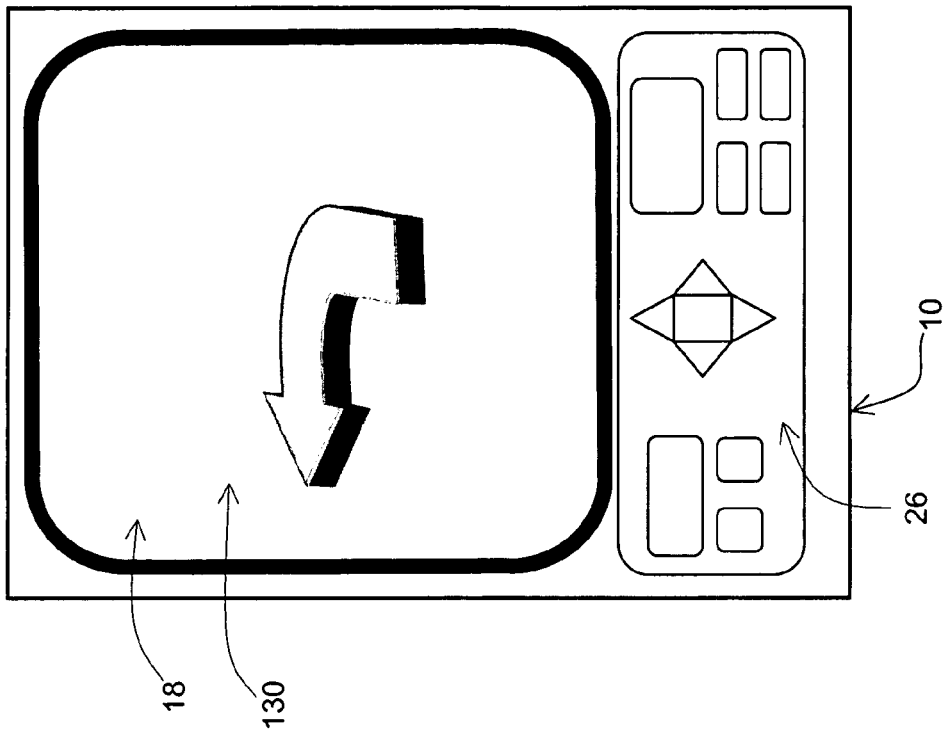
FIG. 8 illustrates the portable navigation system of FIG. 1 with the display showing a 3D stylized image according to another alternative embodiment.

In a further embodiment, the stylized or iconic view can be a 3D view. FIG. 8 shows the display 18 of the navigation system with a 3D stylized view 130 of the maneuver required at an upcoming intersection. This alternative embodiment operates similarly to the previously described embodiment. When the portable navigation system is approaching an intersection at which a maneuvering instruction is to be presented, the map display application in the portable navigation system begins showing alternating displays including an overhead view (similar to FIG. 5A) and a stylized 3D view (similar to FIG. 8). These alternating views are presented until the portable navigation system has passed through the location at which a maneuvering instruction is needed.

It is intended that the foregoing detailed description be regarded as illustrative rather than limiting and that it is understood that the following claims including all equivalents are intended to define the scope of the invention.

I claim:

1. A method for displaying map information on a portable computing device comprising the steps of:
   when the portable computing device is approaching a location at which maneuvering guidance is to be provided for following a route, presenting a sequence of alternating images on a display screen of the portable computing device, wherein the alternating images include a perspective view map image and an overhead view map image, and wherein one of the alternating images is presented at a time; and
   when the portable computing device is following the route but not approaching the next location at which maneuvering guidance is to be provided for following the route, presenting an overhead view map image on the display screen of the portable computing device.

2. A method for displaying map information on a portable computing device comprising the steps of:
   when the portable computing device is approaching a location at which maneuvering guidance is to be provided for following a route, presenting a sequence of alternating images on a display screen of the portable computing device, wherein the alternating images include a stylized image of an upcoming maneuver and an overhead view map image, and wherein one of the alternating images is presented at a time; and
   when the portable computing device is following the route but not approaching the next location at which maneuvering guidance is to be provided for following the route, presenting an overhead view map image on the display screen of the portable computing device.

3. The method of claim 1 or 2 wherein each of the alternating images occupies the entire display screen of the portable computing device.

4. The method of claim 1 or 2 wherein the overhead view map image includes an indicator mark superimposed thereon at a location corresponding to a current position of the portable computing device.

5. The method of claim 1 wherein the perspective view map image does not include an indicator mark superimposed thereon at a location corresponding to a current position of the portable computing device.

6. The method of claim 1 wherein the perspective view map image includes an indicator mark superimposed thereon at a location corresponding to a current position of the portable computing device.

7. The method of claim 1 or 2 wherein the overhead view map image includes an indication showing the route to be followed at the upcoming location at which maneuvering guidance is to be provided.

8. The method of claim 1 wherein the perspective view map image includes an indication showing the route to be followed at the upcoming location at which maneuvering guidance is to be provided.

9. The method of claim 1 wherein at least some of the map images include an indicator mark representing the portable computing device, wherein the indicator mark is located at a position on the map image corresponding to the current position of the portable computing device.

10. The method of claim 1 or 2 further comprising:
    accessing data from a map database; and
    using the data accessed from the map database for presenting the images on the display screen.

11. The method of claim 10 wherein the map database is installed in the portable computing device.

12. The method of claim 1 or 2 wherein the portable computing device is removably mounted in a vehicle.

13. The method of claim 1 or 2 further comprising:
    prior to the step of presenting alternating images, calculating the route from an origin to a destination.

14. The method of claim 1 or 2 further comprising:
    determining a current position of the portable computing device.

15. The method of claim 14 wherein the current position is determined by a GPS unit associated with the portable computing device.

16. The method of claim 1 further comprising:
    prior to the step of presenting alternating images, accessing a map database that contains data representing a geographic area that includes a road network;
    selecting 2D data from the map database that represents portions of the road network along the route; and transposing the 2D data for rendering the perspective view map image.

17. The method of claim 2 wherein the stylized image of the upcoming maneuver is a 2D image.

18. The method of claim 2 wherein the stylized image of the upcoming maneuver is a 3D image.

* * * * *